United States Patent [19]
Holme

[11] 3,852,018
[45] Dec. 3, 1974

[54] CONCRETE PIPE STABILIZING RING
[75] Inventor: Bent Melchior Karlsen Holme, Bronderslev, Denmark
[73] Assignee: Pedershaab Maskinfabrik A/S, Bonderslev, Denmark
[22] Filed: Jan. 31, 1973
[21] Appl. No.: 328,331

[30] Foreign Application Priority Data
Feb. 9, 1972 Denmark .............................. 579/72

[52] U.S. Cl. ................. 425/472, 249/219, 269/287, 248/351, 425/383, 425/392, 425/393
[51] Int. Cl. .......................................... F16m 13/00
[58] Field of Search ........... 425/DIG. 218, 392, 393, 425/383, 468; 269/287; 100/269 A; 249/219; 248/351

[56] References Cited
UNITED STATES PATENTS
| | | | |
|---|---|---|---|
| 2,360,528 | 10/1944 | Talmage | 425/78 X |
| 2,725,597 | 12/1955 | Douglass | 425/392 |
| 3,425,093 | 2/1969 | Ansette | 425/393 X |
| 3,484,900 | 12/1969 | Sands et al. | 425/393 |
| 3,570,065 | 3/1971 | Guerrero | 425/393 |
| 3,706,519 | 12/1972 | Soethje | 425/393 UX |

Primary Examiner—Robert L. Spicer, Jr.
Attorney, Agent, or Firm—Owen, Wickersham & Erickson

[57] ABSTRACT

A ring for stabilizing the upper end of concrete pipes during their hardening, comprising an inner and an outer ring part, one of which presents a shaping face for the pipe while the other one is provided with an inflatable annulus serving, when inflated, to press the pipe material, while still plastic, firmly against said shaping face.

3 Claims, 1 Drawing Figure

PATENTED DEC 3 1974　　　　　　　　　3,852,018
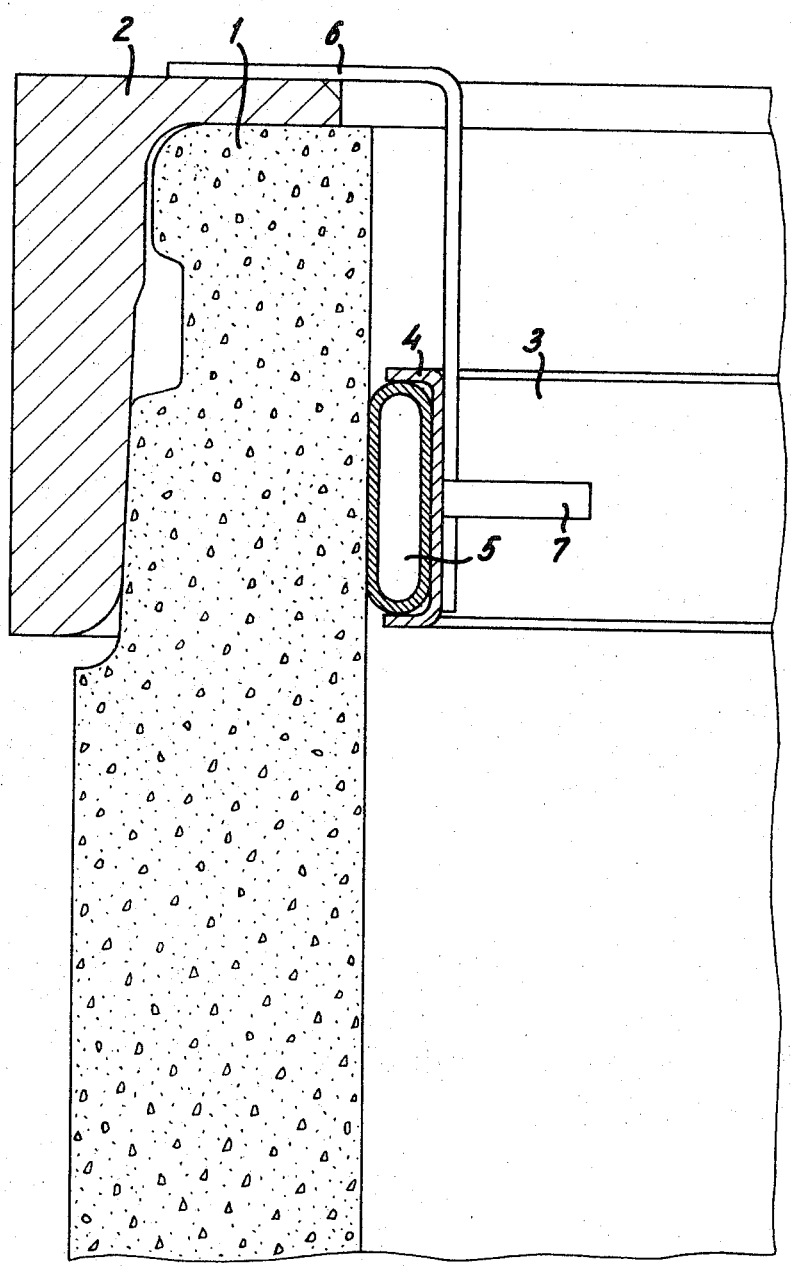

CONCRETE PIPE STABILIZING RING

BACKGROUND OF THE INVENTION

In the production of cast concrete pipes the removal of the cast body from the mould does, as a rule, take place immediately after the casting operation proper and the freshly-cast but still somewhat plastic pipe is left to stand so as to harden. When it is a question of socketed pipes, these pipes are stood with the socket end facing downwards and resting on a loose bottom ring which, together with the pipe itself, has been removed from the mould. On the upwardly facing spigot of the pipe, a composed stabilizing ring consisting of an outer and an inner part is fitted which is intended to stabilize this end of the pipe and which determines the ultimate shape and dimension of the pipe exterior. The inner part of the stabilizing ring is utilized to urge the concrete, while still plastic, outwardly against the inside of the outer mould part which is of firm shape and, with a view hereto, it is known to design the inner portion as a conical ring which, subsequently to the outer portion having been mounted, is pressed down into the concrete pipe. Hereby, the pipe is subjected to a highly uneven pressure by the inner portion of the stabilizing ring which, due to its geometrical configuration, exerts a strong edge or toe pressure on the pipe. This can result in damage leading to the pipe having to be rejected.

SUMMARY OF THE INVENTION

With this prior art as its basis the invention pertains to a ring for stabilizing freshly cast pipes of concrete or similar material during the hardening period, comprising an outer and an inner part, one of which serves to press the still plastic material of the pipe body at one end thereof firmly against the other part with a view to finally shaping the pipe end. According to the invention, this stabilizing ring is characteristic in that the part serving to exert the pressure, usually the inner part, is provided with an annulus that can be inflated against the pipe wall.

When the firm or non-inflatable part of the stabilizing ring is fitted on or in the pipe end, it is easy, without causing any damage, to mount the other part with the uninflated annulus in or on the pipe end and in such a way that the active pressure zone of the ring obtains just the positioning desired. By the annulus being subsequently inflated, the pipe end is subjected to the desired pressure between the two ring parts and, once the hardening process is terminated, the parts of the stabilizing ring can be immediately released by the pressure fluid employed in the annulus being allowed to escape.

It is possible by means of the inflatable annulus to exert a quite uniformly distributed pressure on the cast body and against the firm or non-inflatable part of the stabilizing ring, and the risk of material being scraped off from the pipe end or other forms of damage to it can be regarded as excluded.

According to the invention it is preferred that the ring part with the inflatable annulus, in its operative position, be carried by the other ring part that is of firm shape, by means of stirrups or similar fittings for determining the positioning of the two parts relative to each other. It can be ensured hereby that the part with the inflatable annulus is almost inevitably placed in correct relationship with the pipe end.

BRIEF DESCRIPTION OF THE DRAWING

The invention will now be more fully described with reference to the accompanying drawing which shows a partial section through the upwardly facing spigot of a freshly cast concrete pipe with a stabilizing ring mounted thereupon.

DESCRIPTION OF THE PREFERRED EMBODIMENT

In the drawing, 1 designates the spigot of a freshly cast concrete pipe which has been left standing for hardening and on which a stabilizing ring has been fitted consisting of an outer part 2 that is of firm shape and an inner part 3 which is composed of a carrying ring 4 and an inflatable rubber hose 5 resting in an outwardly facing groove in the carrying ring 4. The ring is suspended in a plurality of stirrups 6 or similar angular holders resting on the top side of the outer ring part 2 of the stabilizing ring so as to determine the accurate positioning of the inner part 4,5 inside the pipe 1. After the inner part 4,5 has been mounted, its rubber hose can be inflated by compressed air being supplied through a connecting branch 7 with a stop valve (not shown).

After the pipe has hardened, the stabilizing ring can be immediately lifted off after the stop valve has been opened so that the compressed air escapes from rubber hose or tube 5.

If so desired, a similar stabilizing ring can be employed on the socketed end of a freshly cast concrete pipe, but in this case the inner part of the stabilizing ring should be the one of firm shape while the outer part carries the inflatable annulus since, when pipe sockets are involved, it is of greater importance to obtain accurate dimensions on the inside than on the outside.

It will have to be mentioned for the sake of completeness that the inflatable annulus does not necessarily have to be an elastic piece of hose 5 as shown in the drawing. It is, for example, possible to employ instead a skirt corresponding to the outer wall of the hose and having its upper and lower edge portions connected closely to carrier ring 4 in a suitable manner as, for instance, by full face bonding or vulcanization.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. Apparatus for stabilizing freshly cast pipe of concrete or similar material while in upright position during the hardening period, comprising:
   - a rigid outer cylindrical member having a regular inner surface in direct contact with the outer like regular surface of an upper portion of the pipe,
   - an inner rigid cylindrical member located within the pipe and of smaller diameter than the inner diameter of the pipe and concentric therewith,
   - and an inflatable ring member supported on the outer portion of the inner rigid cylindrical member and located between said inner cylindrical member and the inner surface of the pipe in opposed relation to the rigid outer cylindrical member for bearing against the inner pipe surface and the outer surface of the inner cylindrical member when inflated, for securing between them said upper portion of the pipe.

2. Apparatus according to claim 1 wherein said outer rigid cylindrical member is provided with an inwardly extending flange at one end thereof for supporting the outer rigid cylinder member at the upper end of the pipe when in an upright position.

3. Apparatus according to claim 2, further including support means for suspending said inner cylindrical member from said flange.

* * * * *

UNITED STATES PATENT OFFICE
CERTIFICATE OF CORRECTION

Patent No. 3,852,018                Dated December 3, 1974

Inventor(s) BENT MELCHIOR KARLSEN HOLME

It is certified that error appears in the above-identified patent and that said Letters Patent are hereby corrected as shown below:

Column 4, line 2, "cylinder" should be --cylindrical--.

Signed and sealed this 27th day of May 1975.

(SEAL)
Attest:

RUTH C. MASON
Attesting Officer

C. MARSHALL DANN
Commissioner of Patents
and Trademarks